United States Patent
Ivers et al.

(10) Patent No.: US 7,154,532 B2
(45) Date of Patent: Dec. 26, 2006

(54) VIDEO FIELD RATE PERSISTENCE

(75) Inventors: Kevin T. Ivers, Woodland, WA (US); Evan Albright, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 490 days.

(21) Appl. No.: 10/772,727

(22) Filed: Feb. 4, 2004

(65) Prior Publication Data

US 2005/0259183 A1    Nov. 24, 2005

(51) Int. Cl.
- H04N 17/02 (2006.01)
- G01R 13/02 (2006.01)
- G06T 11/20 (2006.01)

(52) U.S. Cl. ............... 348/184; 702/67; 345/440.1

(58) Field of Classification Search ........... 348/180, 348/184, 490, 182, 615, 607, 910; 345/440.1; 324/121 R; 702/67

See application file for complete search history.

(56) References Cited

U.S. PATENT DOCUMENTS

| | | | |
|---|---|---|---|
| 4,339,803 A * | 7/1982 | Michael et al. ............. 708/322 |
| 4,518,991 A | 5/1985 | Dureux |
| 4,642,623 A | 2/1987 | Dureux |
| 4,775,859 A * | 10/1988 | Starkey et al. .............. 345/13 |
| 4,829,293 A | 5/1989 | Schlater |
| 5,215,094 A | 6/1993 | Franklin et al. |
| 5,245,414 A * | 9/1993 | Wischermann ............. 348/500 |
| 5,258,753 A * | 11/1993 | Jonker et al. ............. 345/440.2 |
| 5,283,596 A | 2/1994 | Long |
| 5,337,403 A | 8/1994 | Klingman |
| 5,510,843 A * | 4/1996 | Keene et al. ............... 348/446 |
| 5,668,469 A | 9/1997 | Natori et al. |
| 5,734,422 A * | 3/1998 | Maurer et al. ............. 348/184 |
| 5,795,297 A | 8/1998 | Daigle |
| 5,844,619 A | 12/1998 | Songer |
| 6,151,010 A | 11/2000 | Miller et al. |
| 6,278,435 B1 | 8/2001 | Etheridge et al. |
| 6,478,680 B1 | 11/2002 | Yoshioka et al. |
| 6,489,997 B1 | 12/2002 | Stapleton |
| 6,532,024 B1 * | 3/2003 | Everett et al. ............. 715/716 |
| 6,556,202 B1 * | 4/2003 | Taraki et al. ............ 345/440.1 |
| 6,989,833 B1 * | 1/2006 | Narita ..................... 345/440.1 |
| 2001/0022588 A1 | 9/2001 | Yost et al. |

FOREIGN PATENT DOCUMENTS

| EP | 0547841 | 6/1993 |
|---|---|---|
| EP | 0676904 | 10/1995 |

* cited by examiner

Primary Examiner—Victor R. Kostak
(74) Attorney, Agent, or Firm—Francis I. Gray

(57) ABSTRACT

A video field rate persistence is provided for a video waveform display where multiple video components are displayed simultaneously, one component being updated per field interval. A persistence count is assigned to each pixel in a circular field buffer which is divided equally into a number of sub-buffers representing a portion of a display raster, one for each component. The persistence count is updated for each update of the circular field buffer with the pixel values being maintained until the persistence count equals a maximum value, at which point the pixel values for that component are updated with new pixel values. In this manner the display pixels for each component are updated every X video fields and are maintained at their prior values between updates to provide a flicker free display without temporal separation.

1 Claim, 2 Drawing Sheets

VIDEO FIELD RATE PERSISTENCE

BACKGROUND OF THE INVENTION

The present invention relates to the display of video waveform data, and more particularly to a video field rate persistence for the video waveform data to eliminate flickering.

In certain field rate video displays on a video waveform monitor, such as a component video parade display, it is not cost effective to update each parade element (video component) on every field output to the video waveform monitor. Therefore the displayed field rate waveform parade appears to flicker due to each parade element being alternately and separately displayed once during each consecutive field. For instance in a field rate RGB display the R parade element is displayed in the first third of the display during fields N, N+3, N+6, etc., the G parade element is displayed in the second third of the display during fields N+1, N+4, N+7, etc., and the B parade element is displayed in the last third of the display during fields N+2, N+5, N+8, etc.

Besides causing display flicker, the temporal separation between the various parade elements and overlay elements in field rate displays makes it difficult to perform a coherent "screen capture" for use in hardcopy or web interface applications since only one of the elements is displayed per field interval or display cycle.

What is desired is a means for alleviating the display flickering and temporal separation of multiple elements in a video waveform monitor display which updates at a field rate.

BRIEF SUMMARY OF THE INVENTION

Accordingly the present invention provides a video field rate persistence for alleviating display flickering and temporal separation of multiple components on a video waveform monitor by providing a per pixel persistence lasting for X fields, where X is usually set to the number of the multiple components. A persistence count is assigned to each pixel which indicates the number of fields since the pixel was updated. When a new pixel value for one of the elements is input or the persistence count is maximum, the persistence count is reset to zero and the new pixel value replaces the previous pixel value for that component. The other components have their persistence count incremented and the previous pixel value is rewritten as the current pixel value for those components. In this way for each field when the display is updated, all of the components are displayed rather than just the one for which new pixel values are received.

The objects, advantages and other novel features of the present invention are apparent from the following detailed description when read in conjunction with the appended claims and attached drawing.

DETAILED DESCRIPTION OF THE INVENTION

Figure 1:
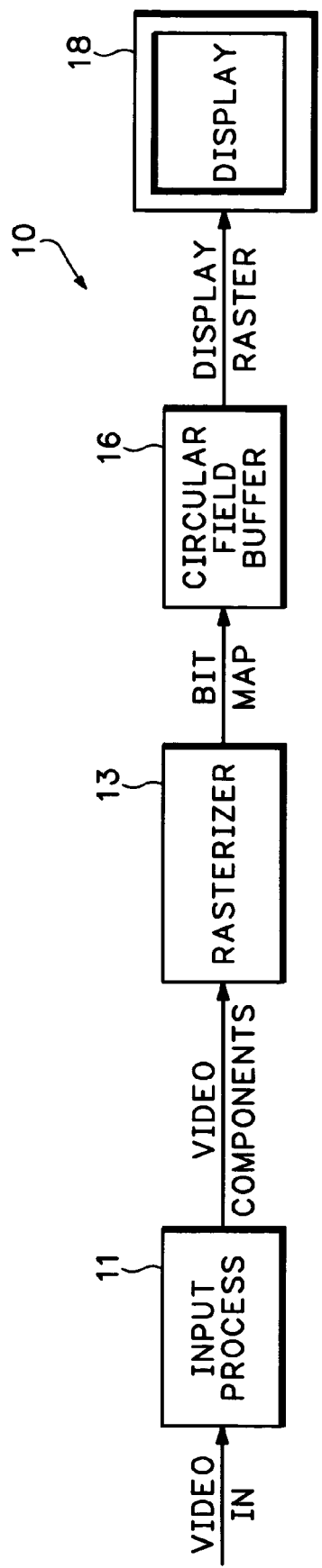
FIG. 1 is a block diagram view of a waveform monitor having video field persistence according to the present invention.

Referring now to FIG. 1 a waveform monitor 10 receives a serial digital video signal at an input of an input processor 11. The input processor 11 provides for cable equalization, reclocking and serial-to-parallel conversion so that the output from the input processor is in the form of parallel video components Y, Pb, Pr. The parallel video components are input to a rasterizer 13 that rasterizes one complete field of each video component into a separate bit map, sequentially one incoming field at a time. The resulting bit maps are sent to a circular field buffer 16 with a persistence algorithm 12 as described below. For example for sequential bit maps, bit map 1 has the Y component of incoming field 1, bit map 2 has the Pb component of incoming field 2, bit map 3 has the Pr component of incoming field 3, bit map 4 has the Y component of incoming field 4, . . . bit map N has the Pr component of incoming field N. In the bit map the Y-axis represents the selected component value, the X-axis represents time (corresponding to one video line) and the Z-axis represents intensity ( the sum of overlayed pixels for all of the video lines of a particular field). The output from the circular field buffer 16 is a display raster for a 18 display, the display raster being divided into sub-buffers, one for each separate video component.

Figure 2:
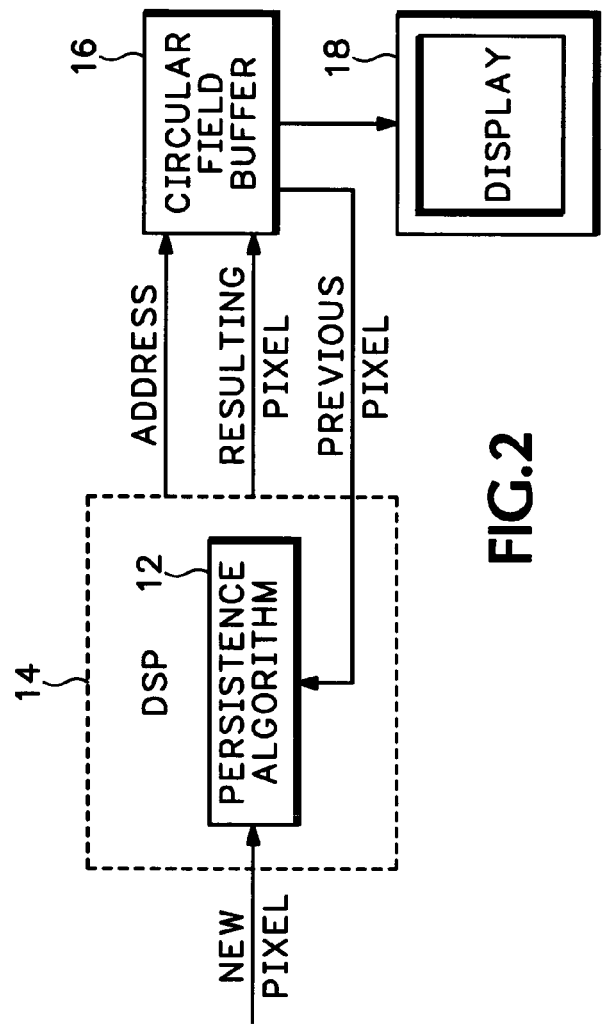
FIG. 2 is a block diagram view of a circular field buffer with video field persistence according to the present invention.

As shown in FIG. 2 new pixel data for display from the latest bit map output by the rasterizer 13 is input to the persistence algorithm 12 within a digital signal processor (DSP) 14. A previous pixel from the circular field buffer 16 also is input to the persistence algorithm 12. Output from the persistence algorithm 12 is a resulting pixel that is input to the circular field buffer 16. Each field the circular field buffer 16 provides the display raster to the video waveform monitor display 18, which is the combination of the sub-buffers. The display raster represents the current bit map input to the circular field buffer 16 as well as the previous two bit maps which are stored in the respective sub-buffers of the circular field buffer according to the persistence algorithm 12, as explained in detail below.

The persistence algorithm 12 is described by the following description:

if (Pixel_Persistence_Count(Previous_Pixel)=Maximum_Persistence($X$)

or

New_Pixel≠0 or

Previous_Pixel=0)

then

Pixel_Persistence_Count(Resulting_Pixel)=0 and

Resulting_Pixel=New_Pixel else

Pixel_Persistence_Count(Resulting_Pixel)=Pixel_Persistence_Count(Previous_Pixel)+1 and

Resulting_Pixel=Previous_Pixel

Figure 3:
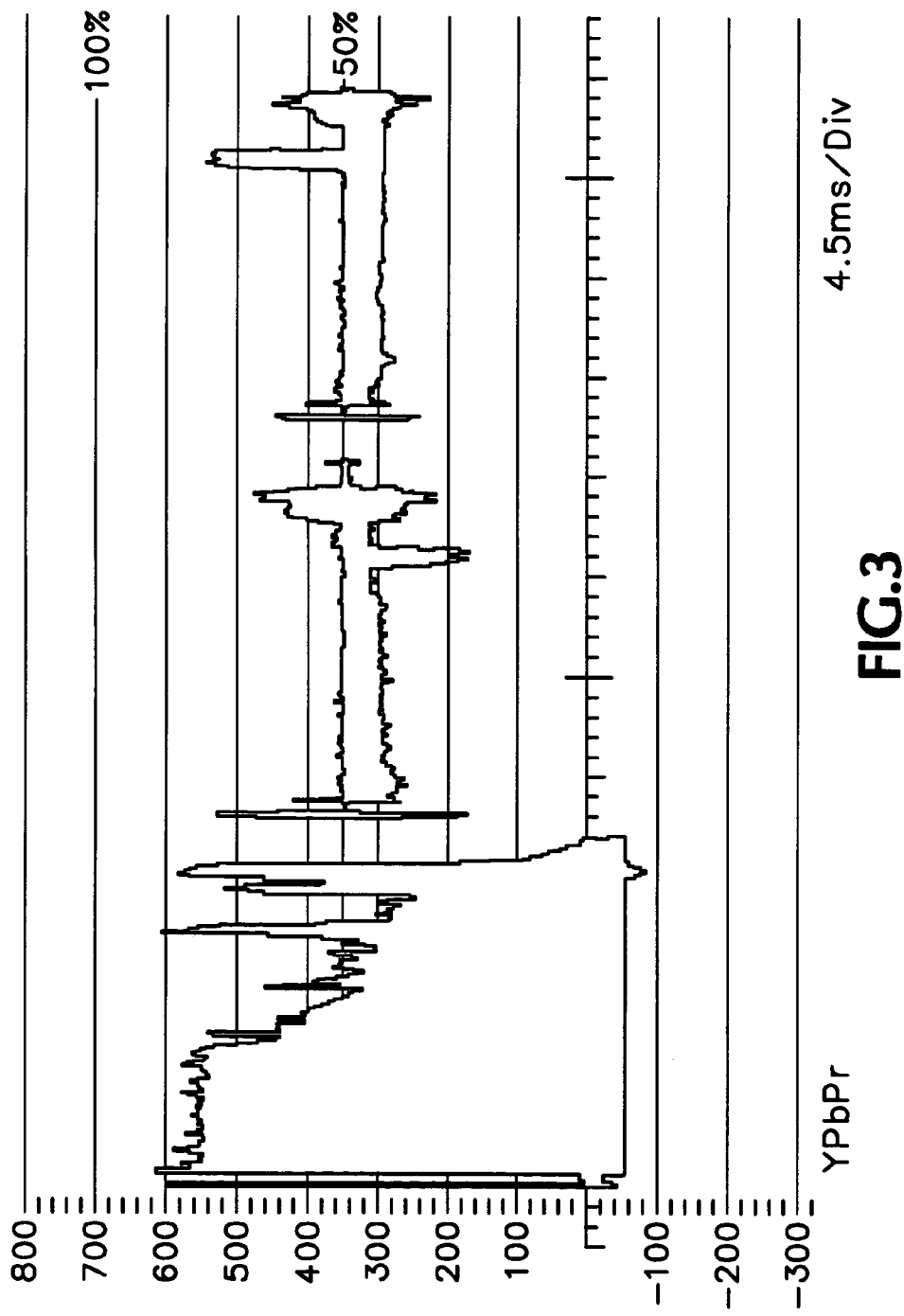
FIG. 3 is a plan view of a video waveform monitor screen illustrating the effect of the video field persistence according to the present invention.

In other words for a video component parade display if the current field or bit map N input to the circular field buffer 16 has Y component parade element data, then X=2 (0≦X≦2) and the new pixels are provided for the first one-third of the display raster and are zero for the other two-thirds of the display raster. The persistence count for the Pb component parade element pixels is one (corresponding to bit map N−1), for the Pr component parade element pixels is zero (corresponding to bit map N−2), and for the Y component parade element pixels is two. Since the previous pixels from the Y component parade element have a persistence count of two, i.e., maximum, the persistence count is set to zero for the resulting pixel and the resulting pixel value is set to the new pixel value for the Y component parade element pixel in the first third of the display raster. For the Pb and Pr component parade element pixels in the second third and last third of the display raster the persistence count is not maximum and the new pixel values are zero, so the persistence count is incremented and the resulting pixel is set to the previous pixel value, i.e., there is no change in the Pb and Pr component parade element pixel values in the last two-thirds of the display raster. Thus the display 18, as shown in the FIG. 3 screen shot, shows the new Y component parade element pixels in the first third of the display raster and the previous Pb and Pr component parade element pixels in the last two thirds of the display raster.

Although the above is described in terms of Y, Pb and Pr video components, it is applicable to any other multiple video component display, such as RGB, with the maximum persistence count being equal to the number of components being displayed. Also the persistence count may be decremented rather than incremented, starting from the maximum persistence count and updating at a zero persistence count.

Thus the present invention provides a video field rate persistence by repeating pixel values in a display raster for video components that are not being updated during a particular field interval being displayed.

What is claimed is:

1. A method of video field rate persistence for displaying multiple video components simultaneously without flicker comprising the steps of:

updating pixel values on a display raster for one of the multiple video components during a field interval;

maintaining pixel values on the display raster for the remaining of the multiple video components during the field interval; and repeating the updating and maintaining steps for each of the multiple video components in turn during consecutive field intervals.

* * * * *